(12) United States Patent
Van Den Berg et al.

(10) Patent No.: US 6,987,135 B2
(45) Date of Patent: Jan. 17, 2006

(54) PHOTOACTIVATABLE WATER BORNE COATING COMPOSITION

(75) Inventors: Keimpe Jan Van Den Berg, Sassenheim (NL); Arie Noomen, Voorhout (NL); Frederik Rous, Amsterdam (NL); Ignace Damiaan Christiaan Rood, Arnhem (NL); Heert Andringa, Deventer (NL); Klaas Jan Hendrik Kruithof, Veenendaal (NL); Ann Kerstin Birgitta Lindell Kjellqvist, Malmö (SE)

(73) Assignee: Akzo Nobel N.V., Arnhem (NL)

( * ) Notice: Subject to any disclaimer, the term of this patent is extended or adjusted under 35 U.S.C. 154(b) by 261 days.

(21) Appl. No.: 10/045,272

(22) Filed: Oct. 25, 2001

(65) Prior Publication Data

US 2002/0156145 A1 Oct. 24, 2002

(30) Foreign Application Priority Data

Oct. 25, 2000 (EP) .................................. 00203722

(51) Int. Cl.
*C08L 75/16* (2006.01)
*C08G 18/48* (2006.01)
*C08G 18/67* (2006.01)
*C08J 3/03* (2006.01)
*C08J 3/28* (2006.01)

(52) U.S. Cl. ..................... 522/97; 522/96; 522/174; 524/507; 524/591; 524/839; 524/840; 525/123; 525/127; 525/452; 525/455; 525/457; 525/458; 525/460; 528/71; 528/75; 528/76; 427/388.4

(58) Field of Classification Search .................. 522/96, 522/97, 174; 524/507, 591, 839, 840; 525/123, 525/127, 452, 455, 457, 458, 460; 528/71, 528/75, 76; 427/388.4
See application file for complete search history.

(56) References Cited

U.S. PATENT DOCUMENTS

| | | | | |
|---|---|---|---|---|
| 2,759,913 | A | 8/1956 | Hulse | 528/341 |
| 4,217,396 | A | 8/1980 | Heckles | 428/500 |
| 4,408,018 | A | 10/1983 | Bartman et al. | 525/300 |
| 4,602,061 | A | 7/1986 | Akkerman | 525/10 |
| 5,391,613 | A | 2/1995 | Brindoepke et al. | 524/591 |
| 5,426,156 | A | 6/1995 | Bederke et al. | 525/426 |
| 5,932,282 | A | 8/1999 | Diener et al. | 427/140 |

FOREIGN PATENT DOCUMENTS

| | | | |
|---|---|---|---|
| CA | 2269412 | * | 10/1999 |
| DE | 196 35 447 C1 | | 11/1997 |
| EP | 0 262 720 A1 | | 4/1988 |
| EP | 0 420 133 B1 | | 4/1991 |
| EP | 0 424 705 A2 | | 5/1991 |
| EP | 0 453 838 A2 | | 10/1991 |
| EP | 0 596 461 A2 | | 5/1994 |
| EP | 0 613 915 A1 | | 9/1994 |
| EP | 0 678 105 B1 | | 10/1995 |
| EP | 0 952 170 A1 | | 10/1999 |
| EP | 0 965 621 A1 | | 12/1999 |
| WO | WO 94/29398 | | 12/1994 |

OTHER PUBLICATIONS

Derwent Abstract No.: 012883648 Abstracting EP 0 965 621 A1.
Derwent Abstract No.: 008814434 Abstracting EP 0 453 838 A2.
Derwent Abstract No.: 012786677 Abstracting EP 0 952 170 A1.
Derwent Abstract No.: 009872957 Abstracting EP 0 596 461 A1.
Journal of Applied Polymer Science vol. 62, 1996, pp. 1775-1782, Song et al. Preparation of UV-Curable Emulsions Using PEG-Modified Urethane Acrylates: The Effect of Nonionic Groups.

* cited by examiner

*Primary Examiner*—Rabon Sergent
(74) *Attorney, Agent, or Firm*—Michelle J. Burke; Joan M. McGillycuddy

(57) ABSTRACT

Photoactivatable water born coating composition comprising
  a) a (meth)acryloyl-functional polyurethane dispersion, with the (meth)acryloyl-functional polyurethane comprising 5 to 18 wt. % of alkylene oxide groups while the (meth)acryloyl functionality is in the range of 2 to 40, and
  b) a UV-initiator.

Preferably, the (meth)acryloyl-functional polyurethane comprises 8 to 18 wt. % of alkylene oxide groups. More preferably, the coating composition comprises a reactive diluent.

The (meth)acryloyl-functional polyurethane is obtainable by reaction of:
  a) at least one organic polyisocyanate,
  b) optionally, at least one organic compound containing at least two isocyanate-reactive groups and having a number average molecular weight in the range of 400 to 6,000,
  c) at least one isocyanate-reactive and/or isocyanate-functional compound bearing non-ionic dispersing groups,
  d) at least one isocyanate-reactive (meth)acryloyl-functional compound,
  e) optionally, at least one active hydrogen-containing chain extender, and
  f) optionally, at least one active hydrogen-containing compound bearing ionic groups.

The water born coating composition is especially suitable for application as a clear coat.

15 Claims, No Drawings

PHOTOACTIVATABLE WATER BORNE COATING COMPOSITION

FIELD OF THE INVENTION

The invention relates to a photoactivatable water borne coating composition comprising a (meth)acryloyl-functional polyurethane dispersion and a UV-initiator.

BACKGROUND OF THE INVENTION

Photoactivatable coating compositions of the type indicated above are known from, int. al., EP-A-0 952 170. The system disclosed therein is based on dual cure and therefore comprises, besides a (meth)acryloyl-functional polyurethane dispersion, free isocyanate groups which may further react with one or more active hydrogen atoms in the aqueous coating composition. Though high-quality coating layers can be obtained with the known water borne coating compositions, the properties of the aqueous polyurethane dispersions used in the known compositions are still a subject for improvement, especially as far as the appearance of layers containing said dispersions is concerned when applied over substrates with rough surfaces.

Photoactivatable polyurethane resins as such for use in clear coats were already known from DE-C-196 35 447. In this document use is made of a polyurethane- and/or polyester-(meth)acrylate resin with diacrylate monomers as reactive diluents. While the compositions are said to be suitable for use in solvent borne and water borne compositions, in the examples solvent borne compositions only are employed, which are cured by pulsed high-energy ultraviolet radiation.

EP-A-0 965 621 discloses a photoactivatable coating composition which comprises a (meth)acryloyl-functional polyurethane and a photoinitiator such as phenylglyoxylic acids or their esters or salts or derivatives thereof, optionally with other photoinitiators. Though explicit mention is made of the possible use of the claimed coating compositions in water borne systems, in the examples only solvent borne systems are used.

SUMMARY OF THE INVENTION

The invention now provides water borne coating compositions which do not detract from the performance when applied over substrates with rough surfaces and which need not be cured by pulsed high-energy ultraviolet radiation, but can be cured with UV light such as UV-A light. Furthermore, it has been found that the resins used in the water borne coating compositions of the present invention cannot be used as such in a solvent borne coating composition, especially when the solvent borne coating composition is used as a clear coat over a base coat. The resulting coating prepared from the coating composition of the present invention has excellent properties such as water and solvent resistance, hardness, scratch resistance, appearance, dry and wet adhesion, and flexibility.

The invention pertains to a photoactivatable water borne coating composition comprising
a) a (meth)acryloyl-functional polyurethane dispersion, with the (meth)acryloyl-functional polyurethane comprising 5 to 18 wt. % of alkylene oxide groups while the (meth)acryloyl functionality is in the range of 2 to 40, and
b) a UV-initiator.

DETAILED DESCRIPTION OF THE INVENTION

The preferred alkylene oxide groups in the (meth)acryloyl-functional polyurethane are ethylene oxide groups, but alternatively propylene oxide groups or mixtures of ethylene oxide and propylene oxide groups are useful as well. For example, the alkylene oxide groups may be $C_1$–$C_4$ alkoxy ethers of polyalkylene glycols with the structure:

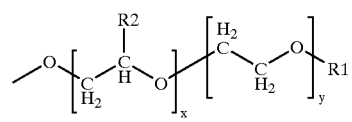

wherein R1 is a hydrocarbon radical with 1 to 4, preferably 1 or 2, carbon atoms; R2 is a methyl group; x is between 0 and 40, preferably between 0 and 20, most preferably between 0 and 10; y is between 0 and 50, and x+y is between 2 and 50, preferably between 2 and 25. Examples are the methoxy ethers of polyethylene glycols or polypropylene glycols having a number average molecular weight between 100 and 3,000, preferably between 200 and 1,500, most preferably between 350 and 1,000.

Thus far very good results have been obtained with a (meth)acryloyl-functional polyurethane comprising 8 to 18 wt. % of alkylene oxide groups.

The (meth)acryloyl functionality of the polyurethane is in the range of 2 to 40, preferably 2.5 to 20, more preferably 3 to 10.

The acid number of the (meth)acryloyl-functional polyurethane is preferably up to 15 mg KOH/g solid, more preferably up to 10.

Superior results are generally obtained with a (meth)acryloyl-functional polyurethane wherein the number average molecular weight of the (meth)acryloyl-functional polyurethane is in the range of 1,000 to 20,000, whereas optimum results have been obtained with a (meth)acryloyl-functional polyurethane having a number average molecular weight in the range of 1,200 to 8,000.

A special feature of the water borne coating compositions according to the invention is their good appearance as a clear coat when applied over a (metallic) base coat. Said good appearance as a result of optimum cross-link density and shrinkage of the obtained film is shown to full advantage when the equivalent weight of the (meth)acryloyl-functional polyurethane is in the range of 200 to 4,000 g/eq on solid, preferably between 350 and 1,000.

The (meth)acryloyl groups-containing polyurethane dispersions can be prepared using conventional methods of polyurethane synthesis by conversion of polyisocyanates with hydroxyalkyl (meth)acrylates and a chain extender if desired. Suitable chain extenders include diols, polyols, dithiols, polythiols, diamines, and polyamines.

Preference is given to a (meth)acryloyl-functional polyurethane which is obtainable by reaction of:
a) at least one organic polyisocyanate,
b) optionally, at least one organic compound containing at least two isocyanate-reactive groups and having a number average molecular weight in the range of 400 to 6,000,
c) at least one isocyanate-reactive and/or isocyanate-functional compound bearing non-ionic dispersing groups,
d) at least one isocyanate-reactive (meth)acryloyl-functional compound, e) optionally, at least one active hydrogen-containing chain extender, and f) optionally, at least one active hydrogen-containing compound bearing ionic groups.

The organic polyisocyanate (a) used in making the (meth) acryloyl-functional polyurethane polymer may be an aliphatic, cycloaliphatic or aromatic di-, tri- or tetra-isocyanate that may be ethylenically unsaturated or not, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate (Desmodur® W), toluene diisocyanate, 1,3-bis(isocyanatomethyl) benzene, xylylene diisocyanate, α,α,α',α'-tetramethyl xylylene diisocyanate (TMXDI®), 1,5-dimethyl-2,4-bis(2-isocyanatoethyl) benzene, 1,5-dimethyl-2,4-bis(2-isocyanatoethyl) benzene, 1,3,5-triethyl-2,4-bis (isocyanatomethyl) benzene, 4,4'-diisocyanato-diphenyl, 3,3'-dichloro-4,4'-diisocyanato-diphenyl, 3,3'-diphenyl-4,4'-diisocyanato-diphenyl, 3,3'-dimethoxy-4,4'-diisocyanato-diphenyl, 4,4'-diisocyanato-diphenyl methane, 3,3'-dimethyl-4,4'-diisocyanato-diphenylmethane, diisocyanato-naphthalene, the adduct of 2 molecules of a diisocyanate, for example hexamethylene diisocyanate or isophorone diisocyanate, to a diol such as ethylene glycol, the adduct of 3 molecules of hexamethylene diisocyanate to 1 molecule of water (available under the trademark Desmodur N of Bayer), the adduct of 1 molecule of trimethylol propane to 3 molecules of toluene diisocyanate (available under the trademark Desmodur L of Bayer), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. It is preferred that use be made of an aliphatic or cycloaliphatic di- or triisocyanate containing 6–36 carbon atoms. Most preferred are dicyclohexyl methane-4,4'-diisocyanate and hexamethylene diisocyanate.

Mixtures of polyisocyanates can be used and also polyisocyanates which have been modified by the introduction of urethane, allophanate, urea, biuret, carbodiimide, uretonimine or isocyanurate residues.

The organic compounds (b) containing at least two isocyanate-reactive groups and having a number average molecular weight in the range of 400 to 6,000 which may be used in the preparation of the (meth)acryloyl-functional polyurethane preferably are polymeric organic polyols terminated by hydroxyl groups. The organic polyols particularly include diols and triols and mixtures thereof but higher-functionality polyols may be used, for example as minor components in admixture with diols. The polyols may be selected from the group of polyesters, polyester amides, polyethers, polythioethers, polycarbonates, polyacetals, polyolefins, and polysiloxanes. Preference is given to polyols having a molecular weight in the range of 700 to 3,000.

Polyester polyols which may be used include hydroxyl-terminated reaction products of polyhydric alcohols, such as ethylene glycol, propylene glycol, diethylene glycol, neopentyl glycol, 1,4-butanediol, 1,6-hexanediol, furan dimethanol, dimethylol cyclohexane, glycerol, trimethylol propane or pentaerythritol or mixtures thereof with polycarboxylic acids, especially dicarboxylic acids or their ester-forming derivatives, for example succinic, glutaric, and adipic acids, or their dimethyl esters, phthalic anhydride, hexahydrophthalic anhydride or dimethyl terephthalate. Polyesters obtained by the polymerisation of lactones, for example caprolactone, in conjunction with a polyol, may also be used. Preferably, the polyester is prepared from 1,6-hexanediol and hexahydrophthalic anhydride.

Polyester amides may be obtained by the inclusion of aminoalcohols such as ethanol amine in the polyesterification mixtures.

Suitable polyether polyols include polyalkylene oxide glycol, wherein the alkylene oxide may be selected from ethylene oxide and/or propylene oxide units.

Polythioether polyols which may be used include products obtained by condensing thiodiglycol either alone or with other glycols, dicarboxylic acids, formaldehyde, aminoalcohols or aminocarboxylic acids.

Polycarbonate polyols include products obtained by reacting diols, such as 1,3-propane diol, 1,4-butane diol, 1,6-hexane diol, 1,4-cyclohexane dimethanol, diethylene glycol or tetraethylene glycol, with diaryl carbonates, for example diphenyl carbonate, or with phosgene.

Suitable polyolefin polyols include hydroxy-terminated butadiene homo- and copolymers.

In order to ensure that the (meth)acryloyl-functional polyurethane is self-dispersible in water, at least one isocyanate-reactive and/or isocyanate-functional compound bearing non-ionic groups (c) is included as reactant in the preparation of the (meth)acryloyl-functional polyurethane. Suitable non-ionic dispersing groups are the mono $C_1$–$C_4$ alkoxy derivatives disclosed above. Preferably, the (meth)acryloyl-functional polyurethane comprises 8 to 18 wt. % of alkylene oxide groups. Suitable $C_1$–$C_4$ polyalkylene oxide compounds contain at least one hydroxyl group. Examples are methoxy polyethylene oxide glycols, methoxy polyethylene oxide-1,3-diols such as Tegomer® D-3123 (PO/EO=15/85; Mn=1,180), Tegomer® D-3409 (PO/EO=0/100; Mn=2,240), and Tegomer® D-3403 (PO/EO=0/100; Mn=1,180) available from Goldschmidt AG, Germany. Optimum results are obtained with a (meth)acryloyl-functional POLYURETHANE wherein the polyalkylene oxide units are polyethylene oxide units.

The mono $C_1$–$C_4$ alkoxy derivatives may be used as such or incorporated into an adduct. For example, the adduct of a polycarboxylic acid, a polyol, and one of the above-mentioned $C_1$–$C_4$ alkoxy derivatives may be used. Examples of polycarboxylic acids include dicarboxylic acids or their ester-forming derivatives, for example succinic, glutaric, and adipic acids, or their dimethyl esters, phthalic anhydride, hexahydrophthalic anhydride or dimethyl terephthalate, or mixtures thereof. Examples of the polyol include ethylene glycol, propylene glycol, diethylene glycol, neopentyl glycol, 1,4-butanediol, 1,6-hexanediol, furan dimethanol, dimethylol cyclohexane, glycerol, di(trimethylol propane), trimethylol propane or pentaerythritol or mixtures thereof. Preferred is the adduct of hexahydrophthalic anhydride, di(trimethylol propane), and a methoxy polyethylene oxide glycol mentioned above.

As isocyanate-reactive (meth)acryloyl-functional compounds (d) may be used hydroxyalkyl (meth)acrylates, such as 2-hydroxyethyl (meth)acrylate, 2-hydroxypropyl (meth)acrylate, 4-hydroxybutyl (meth)acrylate, 6-hydroxyhexyl (meth)acrylate, and polypropylene glycol mono-(meth)acrylate.

Superior results are generally obtained with the addition products of difunctional or polyfunctional epoxy compounds and (meth)acrylic acid. As examples of suitable difunctional or polyfunctional epoxy compounds, which as such may be solid or liquid, may be mentioned the diglycidyl or polyglycidyl ethers of (cyclo)aliphatic or aromatic hydroxyl compounds, such as ethylene glycol, glycerol, cyclohexane diol, and mononuclear or polynuclear difunctional or trifunctional phenols and bisphenols such as bisphenol-A and bisphenol-F; epoxidised aliphatic and/or cycloaliphatic alkenes, such as dipentene dioxide, dicyclopentadiene dioxide, and vinyl cyclohexene dioxide. Thus far good results have been obtained with difunctional epoxides selected from the group of hydrogenated bisphenol-A diglycidyl ether, 1,4-butanediol diglycidyl ether, 1,6-hexanediol diglycidyl ether, and neopentylglycol diglycidyl ether. Also, a mixture of these addition products and the above-mentioned hydroxyalkyl (meth)acrylates may be used.

As active hydrogen-containing chain extenders (e), compounds bearing groups which are reactive with isocyanate groups can be used. The chain extender may be water, but also an organic polyol, a polyamine or a polythiol. Preferably, organic polyols include compounds having a weight average molecular weight of less than 400. These include diols and triols and mixtures thereof, but higher-functionality polyols may also be used. Examples of such lower-molecular weight polyols include ethylene glycol, diethylene glycol, tetraethylene glycol, bis(hydroxyethyl) terephthalate, cyclohexane dimethanol, furan dimethanol, glycerol, trimethylol propane, and the reaction products up to molecular weight 400 of such polyols with propylene oxide and/or ethylene oxide.

Optionally, at least one active hydrogen-containing compound bearing ionic groups (f) may be included as reactant in the preparation of the (meth)acryloyl-functional polyurethane. Examples include dimethylol propionic acid, sulfosuccinate diol, phosphonate diol, mono hydroxy acids (hydroxy-carboxylic acids), hydroxy sulfonic acids, hydroxy fosfonic acid, and all possible salts of these acids. Preferred is a sulfosuccinate diol prepared from Cardura® E10, maleic acid, and sodium thionite.

More preferably, the (meth)acryloyl-functional polyurethane is obtainable by reaction of:
a) at least one organic polyisocyanate,
c) at least one isocyanate-reactive and/or isocyanate-functional compound bearing non-ionic dispersing groups,
d) at least one isocyanate-reactive (meth)acryloyl-functional compound, and
e) at least one active hydrogen-containing chain extender, or by reaction of
a) at least one organic polyisocyanate,
c) at least one isocyanate-reactive and/or isocyanate-functional compound bearing non-ionic dispersing groups,
d) at least one isocyanate-reactive (meth)acryloyl-functional compound, and
f) at least one active hydrogen-containing compound bearing ionic groups, or by reaction of
a) at least one organic polyisocyanate,
b) optionally, at least one organic compound containing at least two isocyanate-reactive groups and having a number average molecular weight in the range of 400 to 6,000,
c) at least one isocyanate-reactive and/or isocyanate-functional compound bearing non-ionic dispersing groups, and
d) at least one isocyanate-reactive (meth)acryloyl-functional compound.

The (meth)acryloyl-functional polyurethane suitable for preparing the water borne coating compositions according to the invention may be prepared in a conventional manner by reacting a stoichiometric amount or an excess of the organic polyisocyanate (a) with the other reactants (c) and (d) and, optionally, (b), (e), and (f) under substantially anhydrous conditions at a temperature between about 30° C. and about 130° C. until the reaction between the isocyanate groups and the isocyanate-reactive groups is substantially complete. The reactants are generally used in proportions corresponding to a ratio of isocyanate groups to isocyanate-reactive (usually hydroxyl) groups of from about 1:1 to about 6:1, preferably about 1:1. If an excess of the organic polyisocyanate (a) is used, an isocyanate-terminated prepolymer is prepared in a first step. In a second step, at least one isocyanate-reactive group containing compound such as chain extender (e) can be added. The chain extension can be conducted at elevated, reduced or ambient temperatures. Convenient temperatures are from about 5° C. to 95° C. or, more preferably, from about 10° C. to about 45° C.

Preferably, the coating composition of the present invention comprises one or more reactive diluents. Compounds suitable as reactive diluents generally are ethylenically unsaturated compounds. As representative examples of such may be mentioned those compounds disclosed in the previously incorporated EP-A-0 965 621. The reactive diluent preferably has a molecular weight of from about 80 to about 800, more preferably about 100 to about 400. Compounds meeting the molecular weight requirement are suitable for lowering the viscosity of the coating composition. Preferably, reactive diluents are used in an amount of 5 to 50 wt. % on solid resin, more preferably 10 to 40 wt. %.

Examples of monofunctional reactive diluents include the esters of acrylic and methacrylic acid, such as methyl (meth)acrylate, ethyl (meth)acrylate, propyl (meth)acrylate, isopropyl (meth)acrylate, butyl (meth)acrylate, isobutyl (meth)-acrylate, tertiary butyl (meth)acrylate, neopentyl (meth)acrylate, isopentyl (meth)acrylate, n-hexyl (meth) acrylate, isohexyl (meth)acrylate, n-heptyl (meth)acrylate, iso-heptyl (meth)acrylate, octyl (meth)acrylate, iso-octyl (meth)acrylate, 2-ethylhexyl (meth)acrylate, nonyl (meth) acrylate, iso-nonyl (meth)acrylate, decyl (meth)acrylate, iso-decyl (meth)acrylate, undecyl (meth)acrylate, iso-undecyl (meth)acrylate, dodecyl (meth)acrylate, iso-dodecyl (meth)acrylate, tridecyl (meth)acrylate, iso-tridecyl (meth) acrylate, tetradecyl (meth)acrylate, iso-tetradecyl (meth) acrylate, and mixtures thereof. Moreover, the aforesaid esters of acrylic and methacrylic acid may contain radiation-reactive unsaturation in the alcohol radical as well. Additional monofunctional radiation-sensitive compounds which may be used as a reactive diluent include diallyl maleate, diallyl fumarate, vinyl acetate, and N-vinyl-2-pyrrolidone, especially the last compound.

The highly preferred reactive diluents in the clear coats of the present invention are those having more than one radiation-sensitive bond. Such compounds ordinarily are the esters of acrylic or methacrylic acid and a polyhydric alcohol. Further suitable reactive diluents are urethane acrylates, melamine acrylates, epoxy-acrylic acid adducts, and reactive diluents containing polyethylene oxide. Examples of the aforesaid difunctional diluents are ethylene glycol diacrylate and dimethacrylate; isopropylene and propylene glycol diacrylate and dimethacrylate. Similarly, the diol diacrylates and dimethacrylates of butane, pentane, hexane, heptane, and so forth up to and including thirty-six carbon diols are useful in the present clear coats as reactive diluents. Of particular interest are 1,4-butane diol diacrylate, 1,6-hexane diol diacrylate, diethylene glycol diacrylate, trimethylol propane triacrylate, and pentaerythritol tetra-acrylate. Thus far optimum results have been obtained with reactive diluents selected from the group of 3-methoxypropyl-, benzyl-, octyl-, 2-hydroxy-ethyl citraconimide, (meth) acrylate esters of butane diol, hexane diol, and trimethylol propane, the diacrylate ester of butanediol diglycidyl ether, ethoxylated trimethylol propane triacrylate, and the reaction product of α,α,α',α'-tetramethyl xylylene diisocyanate (TMXDI®) with 4-hydroxy butylacrylate and/or the esterification product of 1 mole of 2-hydroxyethyl acrylate and 2 moles of caprolactone, and/or methoxy polyethyleneoxide glycol having a molecular weight between 300 and 1,000.

As examples of UV-initiators which can be used in the clear coats of the invention may be mentioned benzoin ether (Esacure® ex Fratelli Lamberti), benzyl dimethyl ketone acetal (Irgacure® 651 ex Ciba), 1-hydroxy cyclohexyl phenyl ketone (Irgacure® 184 ex Ciba), 2-hydroxy-2-methyl-1-phenyl propane-1-one (Darocur® 1173 ex Ciba), 1-(4-isopropyl phenyl)-2-hydroxy-2-methyl propane-1-one (Darocur® 1116 ex Ciba), diethoxyacetophenone (DEAP® ex Upjohn), methyl thioxanthone (Quantacur® ex Shell), 2,4,6-trimethylbenzoyl diphenyl phosphine oxide (Lucirin TPO® ex BASF), and the bisphosphine oxides such as CGI® 819 and CGI® 403 ex Ciba. The amount of UV-initiator used ranges from 0.001 to 10 wt. % on solids, preferably from 1 to 8 wt. %, more preferably from 2 to 6 wt. %.

The coating compositions according to the invention are radiation curable after application and, optionally, evaporation of solvents. In particular, they are suitable for curing by irradiation with UV radiation. Combinations of IR/UV irradiation are also suitable. Radiation sources which may be used are those customary for UV, such as high- and medium-pressure mercury lamps.

In order to avoid any risk involved in handling UV light of very short wavelength (UV B and/or UV C light), preference is given, especially for use in automotive refinishing shops, to fluorescent lamps, which produce the less injurious UV A light.

The amount of energy necessary to cure the reactive components will of course depend on the light intensity, the angle of exposure to and the distance from the radiation, and the thickness of the coating to be applied, as well as the presence or absence of a free radical initiating catalyst. For any given composition the best method of determining the amount and duration of the radiation required is by experimental determination of the amount of radiation-sensitive groups not cured following exposure to the radiation source.

In circumstances where it appears to be desirable to increase the curing speed in places which are not readily accessible to UV light, the water borne coating composition may comprise compounds having one or more active hydrogen atoms-containing groups which can react with the olefinically unsaturated groups contained in the (meth)acryloyl-functional polyurethane dispersion. Suitable active hydrogen-containing groups are activated CH groups, i.e. a methylene and/or monosubstituted methylene group in the α-position to two carbonyl groups, such as malonate and/or acetoacetate groups. Examples of malonate group-containing compounds and malonate group-containing oligomeric and polymeric compounds are disclosed in U.S. Pat. No. 2,759,913 and U.S. Pat. No. 4,602,061, respectively. Preferred compounds are the oligomeric and/or polymeric malonate group-containing compounds such as polyurethanes, polyesters, polyacrylates, epoxy resins, polyamides, and polyvinyl resins which contain malonate groups in the main chain or are pendant or both.

Malonate group-containing polyurethanes can be obtained, for example, by reacting a polyisocyanate with a hydroxyl group-containing ester of a polyol and malonic acid, or by the esterification or transesterification of a hydroxy-functional polyurethane with malonic acid or a dialkylmalonate.

Malonate group-containing polyesters can be obtained, for example, by the polycondensation of malonic acid, an alkyl malonic acid (such as ethyl malonic acid), a mono- or dialkyl ester of such a malonic acid and/or the reaction product of a malonic ester and an alkyl (meth)acrylate, optionally with other di- or polycarboxylic acids, with di- and/or higher-functional hydroxy compounds, and, optionally, monofunctional hydroxy and/or carboxyl compounds.

Malonate group-containing epoxy esters can be obtained, for example, by esterifying an epoxy resin with malonic acid or a malonic monoester, or by transesterification with a dialkyl malonate, optionally with other carboxylic acids and derivatives thereof.

Malonate group-containing polyamides can be obtained, for example, in the same manner as the polyesters, in which case at least part of the hydroxy compound is replaced with a mono- and/or polyvalent primary and/or secondary amine.

As examples of acetoacetate group-containing compounds may be mentioned acetoacetic esters as disclosed in U.S. Pat. No. 2,759,913 (see especially col. 8, lines 53–54), diacetoacetate compounds as disclosed in U.S. Pat. No. 4,217,396 (see especially col. 2, line 65 through col. 3, line 27), and acetoacetate group-containing oligomeric and polymeric compounds as disclosed in U.S. Pat. No. 4,408,018 (see especially col. 1, line 51 through col. 2, line 6). Preference is given to the oligomeric and/or polymeric acetoacetate group-containing compounds.

Suitable acetoacetate group-containing oligomeric and polymeric compounds can be obtained, for example, from polyalcohols and/or hydroxy-functional polyether, polyester, polyacrylate, vinyl and epoxy oligomers and polymers by reaction with diketene or transesterification with an alkyl acetoacetate. Such compounds can also be obtained by the copolymerisation of an acetoacetate-functional acrylic monomer with other vinyl- and/or acrylic-functional monomers.

Especially preferred among the acetoacetate group-containing compounds for use with the present invention are acetoacetate group-containing oligomers and polymers containing at least 2 acetoacetate groups. It is also especially preferred that such acetoacetate group-containing compounds have an Mn in the range of from about 234 to about 30,000, and an acid number of about 2 or less.

Compounds containing both malonate and acetoacetate groups in the same molecule are also suitable and can be obtained, for example, by a Michael reaction between a malonate-functional polyester and an acetoacetate-functional acrylic compound (e.g., acetoacetoxyethyl acrylate). Additionally, physical mixtures of malonate and acetoacetate group-containing compounds are suitable. Alkylacetoacetates can, in addition, be used as reactive diluents.

Optionally, the activated CH groups-containing compounds may be utilised in the enamine form, such as disclosed in EP-A-0 420 133.

The reaction between activated CH groups-containing compounds and olefinically unsaturated compounds is carried out in the presence of a base. It is preferred that use be made of a base of which the conjugated acid has a pKa of at least 12, such as tetrabutyl ammonium hydroxide, epoxy adduct of tertiary amines, amines of the amidine type, examples of which include tetramethyl guanidine and 1,8-diaza-[5,4,0]-bicycloundecene, and catalysts described in EP-A-0 596 461. Thus far, optimum results have been obtained with 1,8-diaza-[5,4,0]-bicycloundecene.

According to the invention, electrically charged bases also constitute suitable catalysts, provided that the conjugated acid thereof has a pKa>10, preferably >12. As examples of representative bases may be mentioned metal bases. Examples of suitable bases include metal oxides such as sodium methanolate; metal hydroxides such as sodium phenolate; metal hydrocarbon compounds such as n-butyl lithium; metal hydrides such as sodium hydride; metal amides such as potassium amide, and metal carbonates such as potassium carbonate.

Instead of activated CH groups-containing compounds the composition may comprise polyamines such as polyamino amides having an amine number of 60–1,000, which react with the (meth)acrylate groups present in the (meth)acryloyl-functional polyurethane resin, such as disclosed in EP-A-0 262 720. Use may also be made of oligomeric sterically hindered polyamines, such as disclosed in EP-A-0 678 105. Thiol-functional compounds, such as pentaerythritol tetramercapto propionate, which react with the (meth)acrylate groups present in the (meth)acryloyl-functional polyurethane resin, may also be used to improve the surface cure and the scratch resistance of the resulting coating.

Preference is given to a coating composition which comprises compounds having active hydrogen atoms-containing groups such as hydroxyl-, thiol-, and/or amino-functional groups which are reactive with free isocyanate groups. If desired, the isocyanate-reactive groups may be comprised in the (meth)acryloyl-functional polyurethane resin. For use in the water borne coating compositions according to the invention preference is given to compounds bearing hydroxyl-functional groups.

For an organic polyisocyanate to be used in a water borne dual cure coating composition preference is given to a hydrophobic polyisocyanate including polyfunctional, preferably free, polyisocyanates with an average NCO functionality of 2.5 to 5 which may be (cyclo)aliphatic, araliphatic or aromatic in nature. The polyisocyanate may include biuret, urethane, uretdione, and isocyanurate derivatives. One example of a polyisocyanate includes 1,6-hexane diisocyanate, isophorone diisocyanate or bis(isocyanate cyclohexyl) methane, and the above-mentioned derivatives thereof. Normally, these products are liquid at ambient temperature and commercially available in a wide range. Preferred are cyclic trimers (isocyanurates) of 1,6-hexane diisocyanate and isophorone diisocyanate. Usually these compounds contain small quantities of their higher homologues. Optionally, a hydrophilic polyisocyanate may be partially substituted for the hydrophobic polyisocyanate. The polyisocyanate, the (meth)acryloyl-functional polyurethane resin, and, optionally, a further isocyanate-reactive functional compound or resin should be mixed in such a ratio that the NCO:isocyanate-reactive groups ratio is in the range of 0.25–4:1, preferably 0.5–3:1, more preferably 0.75–2.5:1, and most preferably 1–2:1.

The polyisocyanate may be mixed into the (meth)acryloyl-functional polyurethane dispersion by any suitable technique. However, simple stirring is usually sufficient. Sometimes it may be useful to dilute the polyisocyanate somewhat with an organic solvent such as ethyl acetate or 1-methoxy-2-propyl acetate to reduce its viscosity. Also included in the free isocyanate groups-containing coating compositions may be reactive diluents such as water-soluble mono or (preferably) polyhydric alcohols, examples of which include ethylene glycol, propylene glycol, isomeric butane diols, the polyethylene oxide glycols or polypropylene oxide glycols, trimethylol propane, pentaerythritol, and glycerol.

In the presence of a free polyisocyanate generally use is made of a Sn-based catalyst. The pot life at ambient temperature of a free polyisocyanate composition generally is between 4 and 12 hours, depending on the use of the catalysts and their amount.

The coating compositions may further comprise other ingredients, additives or auxiliaries, such as other polymers or polymer dispersions, pigments, dyes, emulsifiers (surfactants), pigment dispersion aids, levelling agents, anti-cratering agents, antifoaming agents, antisagging agents, heat stabilisers, UV absorbers, antioxidants, and fillers.

Suitable types of other polymer dispersions include acrylic polymer emulsions and aqueous polyurethane dispersions.

The coating compositions of the present invention may be applied to any substrate. The substrate may be, for example, metal, plastic, such as PVC, wood, glass, ceramic material, or some other coating layer. The other coating layer may be comprised of the coating composition of the invention or it may be a different coating composition. The coating compositions of the invention show particular utility as clear coats, base coats, pigmented top coats, primers, and fillers. The coating compositions can be applied by conventional means such as by spray gun, brush, or roller, with spraying being preferred. Curing temperatures preferably are between 0 and 80° C. and more preferably between 20 and 60° C. The compositions are particularly suitable in the preparation of coated metal substrates, such as in the refinish industry, in particular the body shop, to repair automobiles and transportation vehicles, and in finishing large transportation vehicles such as trains, trucks, buses, and aeroplanes.

Preferred is the use of the coating composition of the present invention as a clear coat. Clear coats are required to be highly transparent and must adhere well to the base coat layer. It is further required that the clear coat does not change the aesthetic aspect of the base coat by strike-in, i.e. discolouration of the base coat due to its solvation by the clear coat composition, or by yellowing of the clear coat upon outdoor exposure. A clear coat based on the coating composition of the present invention does not have these drawbacks.

In the case of the coating composition being a clear coat, the base coat may be a conventional base coat known in the coating art. Examples are solvent borne base coats, e.g., Autobase® ex Akzo Nobel Coatings BV, and water borne base coats, e.g., Autowave® ex Akzo Nobel Coatings BV. Furthermore, the base coat may comprise pigments (coloured pigments, metallics and/or pearls), wax, solvents, flow additives, neutralising agent, and defoamers. Also high-solids base coats can be used. The clear coat composition is applied to the surface of a base coat and then cured. An intermediate curing step for the base coat may be introduced.

In another preferred embodiment the coating composition of the present invention may be applied as a clear coat on flexible flooring, such as PVC and polyolefin. The preferred application method in that case is by roller coater.

The invention will be illustrated with reference to the following examples. Of course these examples are submitted for a better understanding of the invention only; they are not to be construed as limiting in any manner the scope thereof.

EXAMPLES

Methods

The dispersions' respective average particle size was determined with the aid of dynamic light scattering, with the dispersions diluted to a solids content of about 0.1 wt. %.

The solids content was determined in accordance with ASTM method No. 1644-59, with heating to 140° C. over a period of 30 minutes.

The weight average molecular weight Mw and the number average molecular weight Mn were determined using gel permeation chromatography with polystyrene as the standard.

The Persoz Hardness of the obtained coating layers was determined after 1 and 7 days of ageing in accordance with French industrial standard method NF T30-016, the result being expressed in seconds.

The resistance to methylethyl ketone (MEK) and water was determined after 1 and 7 days of ageing and exposure for one minute (MEK) or for one hour (water). In the resistance test 0 stands for dissolved, 3 for slightly affected, and 5 for excellent.

The appearance was judged visually. A good appearance means: a smooth surface with a high gloss. A bad appearance means: a dull, low gloss level.

The scratch resistance was judged by pressing and scratching a finger-nail on the coating. (−) means: the coating is damaged very easily; (+) means: severe pressure is necessary to damage the coating.

The adhesion evaluation was done with the cross cut test. For the wet adhesion test, the samples were left in water for 5 days and then dried for 1 hour. The rating ranges from 0 to 5 with 5 being best.

Preparation of Acryloyl-Functional Polyurethane Dispersion Comprising Polyethylene Oxide Groups A a) Preparation of a Polyester Comprising Polyethylene Oxide Groups A 3 1 4-neck flask fitted with a variable speed stirrer, thermocouples in combination with a controller, a distillation column, a reflux condenser, a nitrogen sparge, and a heating mantle was charged with a mixture composed of 332 g of hexahydrophthalic anhydride and 1,614 g of polyethylene glycol monomethyl ether of an average molecular weight of 750. The mixture was heated to 170° C. for 30 minutes, cooled to 140° C., and 269 g of di(trimethylol propane) were added, followed by 132 g of xylene and 3.3 g of a 85% aqueous phosphoric acid solution. The mixture was heated to 235° C., and water was azeotropically distilled off until the acid value of the reaction mixture was below 5 mg KOH/g. The mixture was then cooled to 180° C., and xylene was distilled off at reduced pressure. The resulting polyester diol solidified at room temperature and had an acid value of 3.9 mg KOH/g and a hydroxyl value of 59 mg KOH/g.

b) Preparation of an Acryloyl-Functional Diol

A 2-liter 4-neck flask, which was fitted with a variable speed stirrer, a thermocouple, a dry air sparge via the head space, a dip tube, and a heating mantle was charged with 573 g of hydrogenated bisphenol-A-diglycidyl ether (Eponex® 1510 ex Shell), 17.5 g of acrylic acid, and 0.56 g of 2,6-ditert. butyl p-cresol. The mixture was heated to 95° C. while bubbling with dry air. A mixture of 157.7 g of acrylic acid, 0.56 g of 2,6-ditert. butyl p-cresol, and 0.75 g of chromium 2-ethylhexanoate was added dropwise in approximately 3 hours. The temperature of the reaction mixture was maintained between 95 and 100° C. Stirring at this temperature was continued until the acid value of the reaction mixture had dropped below 5 mg KOH/g. The prepared adduct was cooled and diluted with 97 g of dry 2-butanone.

c) Preparation of an Acryloyl-Functional Polyurethane Dispersion Comprising Polyethylene Oxide Groups A 3 1 4-neck flask fitted with a variable speed stirrer, thermocouples in combination with a controller, a condenser, a dry air sparge, and a heating mantle was charged with a mixture composed of 273.2 g of acryloyl-functional diol Ab), 146.7 g of polyester Aa), 12.26 g of trimethylol propane, 99.1 g of 4-hydroxybutyl acrylate, 260.8 g of Desmodur® W (a polyisocyanate ex Bayer), 1.50 g of 2,6-ditert. butyl-p-cresol, and 250 g of 2-butanone. The mixture was heated to 45° C. and stirred until homogeneous, while bubbling with dry air. Then 0.94 g of tin (II) octanoate was added after one hour of stirring. The reaction mixture was stirred for approximately six hours at 80° C. until the isocyanate content was <0.1 wt. %. Then, 3 ml of ethanol 100% was added, and stirring was continued for about 30 minutes. The reaction mixture was cooled to 45° C. After dilution of the reaction mixture with 154 g of 2-butanone the stirrer speed was increased, and 1,125 g of water were added at a rate of 12 ml/min. After all the water had been added, a distillation head and a vacuum pump were connected to the flask and the pressure was gradually lowered until all 2-butanone was distilled off. A white emulsion with the following characteristics was obtained: solids content 44%, equivalent weight 535 on solids, Mn 2,686, Mw 11,153, pH 5.5, and particle size 120 nm.

Preparation of an Acryloyl-Functional Polyurethane Dispersion Comprising Ammonium Carboxylate and Polyethylene Oxide Groups B A 3 1 4-neck flask fitted with a variable speed stirrer, thermocouples in combination with a controller, a condenser, a dry air sparge, and a heating mantle was charged with a mixture composed of 264.3 g of Desmodur® W, 300 g of dry 2-butanone, and 0.87 g of tin (II) octanoate. The mixture was heated to 70° C. while bubbling with dry air. Then a pre-mixed homogeneous mixture of 45° C. consisting of 273.6 g of acryloyl-functional diol Ab), 52.8 g of polyester Aa), 16.7 g of dimethylol propionic acid, 108.5 g of 4-hydroxybutyl acrylate, 1.40 g of 2,6-ditert. butyl-p-cresol, and 270 g of 2-butanone was added dropwise in such a way that the exothermic reaction was kept at 80° C. The reaction was continued while stirring for about 6 hours at 80° C. A further portion of 0.87 g of tin (II) octanoate was added after one hour of stirring. The reaction mixture was stirred for approximately six hours at 80° C. until the isocyanate content was <0.1 wt. %. Then 3 ml of ethanol 100% was added, and stirring was continued for about 30 minutes. The reaction mixture was cooled to 45° C. Subsequently, 95% of the acid groups of the reaction mixture was neutralised with N,N-dimethyl ethanolamine. The stirrer speed was increased, and 1,125 g of water were added at a rate of 12 ml/min. After all the water had been added, a distillation head and a vacuum pump were connected to the flask and the pressure was gradually lowered until all 2-butanone was distilled off. A white emulsion with the following characteristics was obtained: solids content 47%, equivalent weight 560 on solids, Mn 2,286, Mw 6,476, pH 8.8, and particle size 120 nm.

Preparation of an Acryloyl-Functional Polyurethane Dispersion Comprising Sulfo Groups and Polyethylene Oxide Groups C a) Preparation of a Sulfosuccinate Diol To a 5-liter, four-neck round-bottomed flask fitted with a condenser, a thermocouple, a stirrer, and a nitrogen inlet were added 1,249.5 g of Cardura E10 ex Shell Chemicals. The temperature was raised to 140° C., and then 290.3 g of maleic acid were added in portions in one hour. Thereafter the reaction mixture was heated with stirring at 150° C. After reaching an acid number lower than 2 mg KOH/g, the reaction temperature was lowered to 95° C. Then 475 g of water, 710 g of Dowanol-PM ex Dow Chemicals, and 228.0 g of sodium dithionite were added, and stirring was continued for one hour at 60° C. and for another hour at 95° C. Water and Dowanol were then distilled off from the reaction mixture at reduced pressure while the last traces were distilled off azeotropically with 300 g of o-xylene. The reaction mixture was then cooled down to room temperature, 600 g of dry 2-butanone were added, and the precipitate was filtered off from the product.

b) Preparation of an Acryloyl-Functional Polyurethane Dispersion Comprising Sulfo Groups and Polyethylene Oxide Groups To a 2-liter, four-neck round-bottomed flask fitted with a condenser, a thermocouple, a stirrer, and a dry air inlet reaching within the reaction mixture were added 144.7 g of Desmodur® W, 0.43 g of tin (II) octanoate, and 70 g of dry 2-butanone. This solution was heated and at 70° C. over one hour a mixture of 166.0 g of acryloyl-functional diol Ab), 39.1 g of polyester Aa), 62.7 g of sulfo-succinate diol Ca), 63.3 g of 4-hydroxybutyl acrylate, 0.8 g of ionol, and 70 g of dry 2-butanone was added. Thereafter another 0.43 g of tin (II) octanoate was added, and the reaction mixture was heated with stirring at 80° C. until the isocyanate content was <0.1 wt. %. Then the remaining isocyanate was quenched with ethanol.

250 g of this solution were added to 266 g of water in 1.5 hours at 50° C. with vigorous stirring. Stirring was continued for 1.5 hours at 50° C., and then 2-butanone was removed from the dispersion by distillation under reduced pressure. A dispersion with the following characteristics was obtained: solids content 44.4%, equivalent weight 506 on solids, Mn 1,781, Mw 5,231, pH 6.9, and particle size 229 nm.

Preparation of an Acryloyl-Functional Polyurethane Dispersion Comprising Sulfo Groups and Polyethylene Oxide Groups D To a 2-liter, four-neck round-bottomed flask fitted with a condenser, a thermocouple, a stirrer, and a dry air inlet reaching within the reaction mixture were added 120.9 g of Desmodur® W, 0.28 g of tin (II) octanoate, and 60 g of dry 2-butanone. This solution was heated and at 70° C. over one hour a mixture of 131.6 g of acryloyl-functional diol Ab), 44.4 g of polyester Aa), 39.8 g of sulfosuccinate diol Ca), 53.5 g of 4-hydroxybutyl acrylate, 0.5 g of ionol, and 60 g of dry 2-butanone was added. Thereafter another 0.20 g of tin (II) octanoate was added, and the reaction mixture was heated with stirring at 80° C. until the isocyanate content was <0.1 wt. %. Then the remaining isocyanate was quenched with ethanol. 410 g of this product were added to 395 g of water in 1.5 hours at 50° C. with vigorous stirring. Stirring was continued for 1.5 hours at 50° C., and then 2-butanone was removed from the dispersion by distillation under reduced pressure. A dispersion with the following characteristics was obtained: solids content 43.2%, equivalent weight 458 on solids, Mn 1,934, Mw 6,687, and particle size 207 nm.

Preparation of an Acryloyl-Functional Polyurethane Dispersion Comprising Sulfo Groups and Polyethylene Oxide Groups E To a 2-liter, four-neck round-bottomed flask fitted with a condenser, a thermocouple, a stirrer, and a dry air inlet reaching within the reaction mixture were added 116.8 g of Desmodur® W, 0.27 g of tin (II) octanoate, and 60 g of dry 2-butanone. This solution was heated and at 70° C. over one hour a mixture of 144.4 g of acryloyl-functional diol Ab), 62.7 g of polyester Aa), 9.7 g of sulfosuccinate diol Ca), 50.3 g of 4-hydroxybutylacrylate, 0.85 g of ionol, and 60 g of dry 2-butanone was added. Thereafter another 0.41 g of tin (II) octanoate was added, and the reaction mixture was heated with stirring at 80° C. until the isocyanate content was <0.1 wt. %. Then the remaining isocyanate was quenched with ethanol.

235 g of this product were added to 244 g of water in 1.5 hours at 50° C. with vigorous stirring. Stirring was continued for 1.5 hours at 50° C., and then 2-butanone was removed from the dispersion by distillation under reduced pressure. A dispersion with the following characteristics was obtained: solids content 49.4%, equivalent weight 449 on solids, Mn 2,071, Mw 7,663, and particle size 837 nm.

Preparation of an Acryloyl-Functional Polyurethane Dispersion Comprising Polyethylene Oxide Groups F A 1-liter four-neck round-bottom flask was fitted with a condenser, a thermometer, a stirrer, a dry air inlet reaching within the reaction mixture, and an oil bath heating. The flask was charged with 94.6 g of 1,6-hexamethylene diisocyanate, 167.2 g of acryloyl-functional diol Ab), 100.5 g of polyester Aa), 6.9 g of trimethylol propane, 55.9 g of 4-hydroxybutyl acrylate, 0.45 g of 2,6-di-tert. butyl-p-cresol, and 150 g of dry 2-butanone. The reaction mixture was heated to 45° C. and then 0.25 g of tin (II) octanoate was added. Thereafter the reaction mixture was heated further to 70° C. and then 0.20 g of tin (II) octanoate was added. The reaction mixture was heated with stirring at 80° C. until the isocyanate content was <0.1 wt. %. The remaining isocyanate was quenched with ethanol. 50 g of 2-butanone were added to 400 g of the thus obtained polyurethane solution. At 45° C. 450 g of water were added in 2 hours with vigorous stirring. Stirring was continued for 1 hour. Subsequently the 2-butanone was removed from the dispersion using a rotarvapor. A dispersion with the following characteristics was obtained: solids content 41.6%, equivalent weight 431 on solids, Mn 2,414, Mw 20,884, and particle size 2,385 nm Preparation of an Acryloyl-Functional Polyurethane Dispersion Comprising Polyethylene Oxide Groups G a) Preparation of a Polyester Diol A 2-liter 4-neck flask was fitted with a variable speed stirrer, a thermocouple in combination with a controller, a packed distillation column, a nitrogen inlet, and a heating mantle. In the flask were placed 874.4 g of 1,6-hexanediol, 59.7 g of hexahydrophthalic anhydride, and 0.42 g of dibutyltin oxide. The reaction mixture was heated with stirring and under nitrogen flow to 250° C. This temperature was kept for 4 hours and 75 g of water were distilled off. The reaction mixture was cooled down to 105° C. The remaining reaction water was distilled off at reduced pressure. The resulting polyester diol had an acid value of 3.2 mg KOH/g, a hydroxyl value of 172 mg KOH/g, Mn 990, and Mw 1,600.

b) Preparation of an Acryloyl Functional Polyurethane Dispersion Comprising Polyethylene Oxide Groups G A 1-liter four-neck round bottom flask was fitted with a condenser, a thermometer, a stirrer, a dry air inlet reaching within the reaction mixture, and an oil bath heating. The flask was charged with 110.0 g of Desmodur® W, 120.7 g of acryloyl-functional diol Ab), 105.0 g of polyester Aa), 76.3 g of polyesterdiol Ga), 22.2 g of 4-hydroxybutyl acrylate, 0.8 g of 2,6-di-tert. butyl-p-cresol, and 175 g of dry 2-butanone. The reaction mixture was heated with stirring to 45° C. and then 0.25 g of tin (II) octanoate was added. Thereafter the reaction mixture was heated further to 70° C. and then 0.25 g of tin (II) octanoate was added. The reaction mixture was heated with stirring at 80° C. until the isocyanate content was <0.15 wt. %. The remaining isocyanate was quenched with ethanol. 100 g of 2-butanone were added to 400 g of the thus obtained polyurethane solution. At 45° C. 450 g of water were added in 2 hours with vigorous stirring. Stirring was continued for 1 hour. Subsequently the 2-butanone was removed from the dispersion using a rotarvapor. A dispersion with the following characteristics was obtained: solids content 44.8%, equivalent weight 763 on solids, Mn 4,251, Mw 34,288, and particle size 128 nm The properties of the (meth)acryloyl-functional polyurethane resins prepared above are listed in table 1.

TABLE 1

| Resin | wt. % EO | Acid number (mg KOH/g) | Mn | Ew (g/eq) | Functionality |
|---|---|---|---|---|---|
| A | 14.5 | 0 | 2,686 | 535 | 5.6 |
| B | 5.6 | 10 | 2,286 | 560 | 4.1 |
| C | 6.1 | 8.08 | 1,781 | 506 | 3.8 |
| D | 8.1 | 6.07 | 1,934 | 458 | 4.3 |
| E | 11.6 | 1.52 | 2,071 | 449 | 4.5 |
| F | 14.7 | n.d. | 2,414 | 431 | 5.6 |
| G | 14.8 | n.d. | 4,251 | 763 | 5.8 |

EXAMPLES 1 TO 5

The following coating compositions were prepared.

Coating composition 1 contained 50.0 g of acryloyl-functional polyurethane dispersion A (solids content 24.3 g), to which were added 7.50 g of water, 2.50 g of butyl glycol, 0.25 g of BYK 346 (wetting agent with a solids content of 0.12 g), and 1.28 g of Darocur® 1173 (UV-initiator ex Ciba).

Coating composition 2 equaled composition 1, except that 7.30 g of Craynor 132 (an acryloyl-functional reactive diluent ex Cray Valley) had been added.

Coating composition 3 contained 50.0 g of acryloyl-functional polyurethane dispersion B (solids content 20.0 g), to which were added 2.50 g of butyl glycol, 0.25 g of BYK 333 (wetting agent with a solids content of 98%), and 0.83 g of Lucirin TPO-L (UV-initiator ex BASF).

Coating composition 4 equaled composition 3 after the addition of 6.23 g of Craynor 132.

Coating composition 5 contained 50.0 g of acryloyl-functional polyurethane dispersion A (solids content 25.15 g), to which were added 7.50 g of water, 2.50 g of butyl glycol, 0.25 g of BYK 333, 7.55 g of Craynor 132, and 1.31 g of Lucirin TPO-L.

Compositions 1–4 were applied on tin plated panels by draw bar (100 μm wet application thickness). Compositions 1–5 were applied on a blue metallic water borne base coat (Autowave®) by spraying. All clear coats had a dry layer thickness in the range of 65 to 90 μm. The panels were dried until all the water had evaporated (at least 90 minutes at room temperature or 30 minutes at 60° C.). The films were subsequently irradiated for 10 minutes at room temperature with sun tanning lamps (TL 09, distance 10 cm).

The properties of the obtained coating layers on tin plated panels (in the case of compositions 1 to 4) or on a water borne base coat (in the case of composition 5 for all properties and of compositions 1–4 for appearance determination) are given in Table 2.

TABLE 2

| Example | Persoz Hardness | | Resistance to MEK | | Resistance to water | | Appearance and scratch resistance | Layer thickness (μm) |
|---|---|---|---|---|---|---|---|---|
| | 1 day | 7 days | 1 day | 7 days | 1 day | 7 days | | |
| 1 | 167 | 238 | 3–4 | 3–4 | 5 | 5 | Moderate/+ | 67 |
| 2 | 165 | 181 | 5 | 5 | 5 | 5 | Good/+ | 71 |
| 3 | 157 | 170 | 3–4[1] | 3–4[1] | 3–4[2] | 3–4[2] | Poor/– | 80 |
| 4 | 133 | 120 | 3–4[1] | 3–4[1] | 3–4[2] | 3–4[2] | Poor/– | 79 |
| 5 | n.d. | n.d. | 3–4 | 3–4 | 5 | 5 | Good/+ | 86 |

[1] Top-layer of the film dissolved
[2] Film became hazy after 1 hour's exposure to water The appearance of the coating layers obtained with compositions 2 and 5 was the best. These experiments show that coating compositions comprising (meth)acryloyl-functional polyurethane having 8 to 18 wt. % alkylene oxide groups are preferred. Even more preferred are these coating compositions comprising a reactive diluent.

COMPARATIVE EXAMPLE A

Prepared was a solvent borne coating composition A containing 50.0 g of a solution of an acryloyl-functional polyurethane (as described for dispersion A) in methylethyl ketone with Craynor 132 (solids content 44.7 g) as reactive diluent and, further, 1.00 g of butyl glycol, 21.43 g of butyl acetate, 16.07 g of methylethyl ketone, and 1.88 g of Darocur® 1173.

After application on a blue metallic water borne base coat (Autowave®) by spraying, the obtained coating layer was dried and irradiated in a manner analogous to that disclosed for the layers obtained with Examples 1 to 5. The properties of the coating layer obtained with the solvent borne coating composition detracted from the performance. The coating layer was highly coloured.

EXAMPLES 6 TO 8

Each coating composition 6 to 8 contained 50.0 g of acryloyl-functional polyurethane dispersion A (solids content 24.3 g), to which had been added 7.50 g of water, 2.50 g of butyl glycol, 0.25 g of BYK 346 (wetting agent with a solids content of 0.12 g), and 1.28 g of Darocur®1173. The respective compositions further comprised 10 wt. % (based on the polyurethane dispersion) of Sartomer® 214 (1,4-butanediol dimethacrylate ex Sartomer) (composition 6), 10 wt. % (based on the polyurethane dispersion) of Sartomer® 239 (1,6-hexanediol dimethacrylate ex Sartomer) (composition 7), and 30 wt. % (based on the polyurethane dispersion) of Sartomer® 350 (trimethylol propane trimethacrylate ex Sartomer) (composition 8).

After application on a tin plate the obtained coating layers were dried and irradiated in a manner analogous to that disclosed for the layers obtained with Examples 1 to 5. The properties of the cured coating layers on tin plated panels (with compositions 6 to 8) are given in Table 3.

TABLE 3

| Example | Persoz Hardness | | Resistance to MEK | | Resistance to water | | Appearance and scratch resistance | Layer thickness ($\mu$m) |
|---|---|---|---|---|---|---|---|---|
| | 1 day | 7 days | 1 day | 7 days | 1 day | 7 days | | |
| 6 | 210 | 209 | 3–4 | 3–4 | 5 | 4 | Good | 72 |
| 7 | 226 | 217 | 3–4 | 3–4 | 5 | 4 | Good | 75 |
| 8 | 235 | 239 | 3–4 | 3–4 | 5 | 4 | Good | 78 |

Coating compositions 6, 7, and 8 were also applied on a blue metallic water borne base coat (Autowave®). All three coatings had a good appearance.

EXAMPLES 9 TO 12

Four acryloyl-functional polyurethane dispersions with different amounts of alkylene oxide groups were tested in the coating compositions as listed in Table 4 (the amounts are given in grams):

TABLE 4

| | 9 | 10 | 11 | 12 |
|---|---|---|---|---|
| dispersion A | 20.0 | — | — | — |
| dispersion E | — | 20.0 | — | — |
| dispersion D | — | — | 20.0 | — |
| dispersion C | — | — | — | 20.0 |
| Water | 5.0 | 3.0 | 3.0 | 3.0 |
| Butyl glycol | 1.0 | 1.0 | 1.0 | 1.0 |
| Byk 346 | 0.1 | 0.1 | 0.1 | 0.1 |
| Darocur 1173 | 0.47 | 0.51 | 0.45 | 0.46 |
| Craynor 132 | 2.70 | 2.96 | 2.59 | 2.66 |

The formulations were applied on tin plates and on a blue metallic water borne base coat (Autowave®). Drying and curing was performed as described in Examples 1 to 5. The results are outlined in Table 5.

TABLE 5

| Formulation | Layer thickness ($\mu$m) | Resistance to MEK (1 day ageing) | Resistance to water (1 day ageing) | Persoz hardness (s) after 1 day ageing | Appearance over base coat | Scratch resistance |
|---|---|---|---|---|---|---|
| 9 | 79 | 5 | 5 | 185 | good | + |
| 10 | 90 | 4 | 5 | 188 | good | + |
| 11 | 75 | 3–4 | 5 | 197 | good | +/− |
| 12 | 77 | 3–4 | 3–4 | 199 | good | − |

These experiments show also that coating compositions comprising (meth)acryloyl-functional polyurethanes having 8 to 18 wt. % alkylene oxide groups and a reactive diluent are preferred.

EXAMPLE 13

The following formulation listed in Table 6 was prepared (the amounts are given in grams):

TABLE 6

| dispersion A | 20.0 |
| Water | 3.0 |
| Butyl glycol | 1.0 |

TABLE 6-continued

| BYK 346 | 0.1 |
| 3-methoxypropyl citraconimide | 2.92 |
| Darocur 1173 | 0.51 |

This formulation was applied on a tin plate and on a blue metallic water borne base coat (Autowave®). Drying and curing was carried out as described for Examples 1–5.

The film had the following characteristics listed in Table 7:

TABLE 7

| Example | Persoz Hardness | | Resistance to MEK | | Resistance to water | | Appearance and scratch resistance | Layer thickness ($\mu$m) |
|---|---|---|---|---|---|---|---|---|
| | 1 day | 7 days | 1 day | 7 days | 1 day | 7 days | | |
| 13 | 171 | 175 | 4 | 4 | 5 | 5 | good/+ | 74 |

EXAMPLE 14 AND COMPARATIVE EXAMPLE B

The following coating compositions listed in Table 8 were prepared (the amounts are given in grams):

TABLE 8

| | | 14 | B |
|---|---|---|---|
| Lux 101 VP | Aliphatic polyurethane dispersion (s.c. 40%) ex Alberdingk Boley | 34.8 | 87 |
| dispersion B | | 52.2 | — |
| Esacure KIP 100F | Photoinitiator ex Lamberti | 1.3 | 1.3 |
| Speedcure BEM | Photoinitiator ex Lambson | 0.4 | 0.4 |
| Byk 346 | Defoamer ex Byk Chemie | 0.3 | 0.3 |
| Byk 333 | Levelling agent ex Byk Chemie | 0.2 | 0.2 |
| Orgasol 2001 | Polyamide wax ex Elf Atochem | 10.5 | 10.5 |
| Borshigel LW44 | polyurethane thickener | 0.3 | 0.3 |

The formulations were applied on PVC flooring by roller coater, between 10 to 50 g/m². The coated substrates were dried until all the water had evaporated (3 minutes at 120° C.). The films were subsequently irradiated at a belt speed of 5 to 10 meters per minute with a 80 W/cm mercury lamp. The results are outlined in Table 9.

TABLE 9

| Formulation | Dry adhesion | Wet adhesion |
|---|---|---|
| 14 | 5 | 5 |
| B | 3 | 0 |

Other properties such as chemical resistance and flexibility are on the same level or better than for the comparative example.

EXAMPLE 15 AND COMPARATIVE EXAMPLE C

The following coating compositions listed in table 10 were prepared (the amounts are given in grams):

TABLE 10

| | | 15 | C |
|---|---|---|---|
| Lux 101 VP | Aliphatic polyurethane dispersion (s.c. 40%) ex Alberdingk Boley | 20.6 | 31.7 |
| dispersion B | | 32.5 | — |
| Primal E-3120 | Acrylic emulsion (s.c. 40%) ex Rohm & Haas | 39.6 | 61.0 |
| Esacure KIP 100F | Photoinitiator ex Lamberti | 1.5 | 1.5 |
| Speedcure BEM | Photoinitiator ex Lambson | 0.5 | 0.5 |
| Dehydran 1293 | Defoamer ex Cognis | 0.6 | 0.6 |
| Byk 346 | Defoamer ex Byk Chemie | 0.3 | 0.3 |
| Byk 333 | Levelling agent ex Byk Chemie | 0.2 | 0.2 |
| Orgasol 2001 | Polyamide wax ex Elf Atochem | 3.8 | 3.8 |
| Acrysol RM-2020 | polyurethane thickener ex Rohm & Haas | 0.4 | 0.4 |

The formulations were applied on polyolefin flooring by roller coater, between 10 to 50 g/m². Drying and curing was carried out as described for example 14.

The results are outlined in table 11.

TABLE 11

| Formulation | Dry adhesion | Wet adhesion |
|---|---|---|
| 15 | 5 | 5 |
| C | 3 | 0 |

Other properties such as chemical resistance and flexibility are on the same level or better than for the comparative example.

EXAMPLES 16 AND 17

The following coating compositions were prepared.

Coating composition 16 contained 50.0 g of acryloyl-functional polyurethane dispersion F (solids content 20.8 g), to which were added 7.50 g of water, 2.50 g of butyl glycol, 0.25 g of BYK 346, and 0.85 g of Darocur® 1173.

Coating composition 17 contained 50.0 g of acryloyl-functional polyurethane dispersion G (solids content 22.4 g), to which were added 7.50 g of water, 2.50 g of butyl glycol, 0.25 g of BYK 346, 1.10 g of Darocur® 1173, and 6.30 g of Craynor 132.

Compositions 16 and 17 were applied on tin plated panels by draw bar (100 μm wet application thickness) and on a blue metallic water borne base coat (Autowave®) by spraying. The panels were dried until all the water had evaporated (at least 90 minutes at room temperature or 30 minutes at 60° C.). The films were subsequently irradiated for 10 minutes at room temperature with sun tanning lamps (TL 09, distance 10 cm). The properties of the obtained coating layers are given in Table 12.

TABLE 12

| | Persoz Hardness | | Resistance to MEK | | Resistance to water | | Appearance and scratch resistance | Layer thickness (μm) |
|---|---|---|---|---|---|---|---|---|
| Example | 1 day | 7 days | 1 day | 7 days | 1 day | 7 days | | |
| 16 | 158 | 170 | 5 | 5 | 5 | 5 | Good/+ | 65 |
| 17 | 137 | 135 | 5 | 5 | 5 | 5 | Good/+ | 77 |

These experiments show that coating compositions according to the present invention provide coatings with excellent properties.

What is claimed is:

1. Photoactivatable water borne coating composition comprising
    a) a (meth)acryloyl-functional polyurethane dispersion, wherein the (meth)acryloyl-functional polyurethane comprises 5 to 18 wt. % of alkylene oxide groups, based on the weight of the (meth)acryloyl-functional polyurethane, and the (meth)acryloyl functionality is in the range of 2 to 40, and
    b) a UV-initiator.

2. Water borne coating composition according to claim 1, wherein the (meth)acryloyl-functional polyurethane comprises 8 to 18 wt. % of alkylene oxide groups, based on the weight of the (meth)acryloyl-functional polyurethane.

3. Water borne coating composition according to claim 1, wherein the coating composition comprises a reactive diluent.

4. Water borne coating composition according to claim 1, wherein the number average molecular weight of the (meth)acryloyl-functional polyurethane is in the range of 1,200 to 8,000.

5. Water borne coating composition according to claim 1, wherein the equivalent weight of the (meth)acryloyl-functional polyurethane is in the range of 200 to 4,000 g/eq on solid.

6. Water borne coating composition according to claim 1, wherein the (meth)acryloyl-functional polyurethane is obtained by reaction of:
    a) at least one organic polyisocyanate,
    b) optionally, at least one organic compound containing at least two isocyanate-reactive groups and having a number average molecular weight in the range of 400 to 6,000,
    c) at least one isocyanate-reactive and/or isocyanate-functional compound bearing non-ionic dispersing groups,
    d) at least one isocyanate-reactive (meth)acryloyl-functional compound,
    e) optionally, at least one active hydrogen-containing chain extender, and
    f) optionally, at least one active hydrogen-containing compound bearing ionic groups.

7. Water borne coating composition according to claim 1, wherein the coating composition is a water borne clear coat.

8. Method of coating a substrate which comprises applying a water borne coating composition according to claim 1 to a substrate, causing or allowing the aqueous based carrier phase of the composition to be removed, and curing the surface of the film obtained with UV light.

9. A photoactivatable water borne coating composition cormprising
    a (meth)acryloyl-functional oolvurethane dispersion wherein the (meth)acryloyl-functional polyurethane comprises 5 to 18 wt % of alkylene oxide groups, based on the weight of the (meth)acryloyl-functional polyurethane, and the (meth)acryloyl functionality is in the range of 2 to 40;
    an organic polyisocyanate; and
    a UV initiator;
    wherein (1) the coating composition further comprises at least one compound comprising isocyanate reactive groups or (2) the (meth)acryloyl-functional polyurethane comprises isocyanate reactive groups.

10. Water borne coating composition according to claim 9, wherein the ratio of the free isocyanate groups to the isocyanate-reactive groups in the coating composition is 0.25–4:1.

11. Water borne coating composition according to claim 9, wherein one or more of the isocyanate-reactive groups is a hydroxyl group.

12. Method of coating a substrate which comprises applying a water borne coating composition according to claim 9 to a substrate, causing or allowing the aqueous based carrier phase of the composition to be removed, curing the surface of the film obtained with UV light, and allowing the unexposed layers to cure thoroughly at room temperature or with heating.

13. Method of coating a metal substrate with a base coat composition and a clear coat composition, the clear coat comprising a (meth)acryloyl-functional polyurethane dispersion wherein the polyurethane has 8 to 18 wt. % of alkylene oxide groups, based on the weight of the (meth)acryloyl-functional polyurethane, and a UV-initiator.

14. Method according to claim 13, wherein the clear coat composition comprises a reactive diluent.

15. Method of coating a flexible flooring with a clear coat composition, the clear coat composition comprising a (meth)acryloyl-functional polyurethane dispersion wherein the polyurethane has 5 to 18 wt. % of alkylene oxide groups, based on the weight of the (meth)acryloyl-functional polyurethane, and a UV-initiator.

* * * * *

UNITED STATES PATENT AND TRADEMARK OFFICE
CERTIFICATE OF CORRECTION

PATENT NO. : 6,987,135 B2
APPLICATION NO. : 10/045272
DATED : January 17, 2006
INVENTOR(S) : Van Den Berg et al.

It is certified that error appears in the above-identified patent and that said Letters Patent is hereby corrected as shown below:

Claim 9:
    Col. 20, line 51 reads "cormprising" should read -- comprising --

Col. 20, line 52 reads "oolvurethane" should read -- polyurethane --

Signed and Sealed this

Thirty-first Day of October, 2006

JON W. DUDAS
*Director of the United States Patent and Trademark Office*